(12) United States Patent
Sakamoto

(10) Patent No.: US 7,388,684 B2
(45) Date of Patent: Jun. 17, 2008

(54) IMAGE TRANSFER APPARATUS

(75) Inventor: Yoichi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 759 days.

(21) Appl. No.: 10/801,846

(22) Filed: Mar. 15, 2004

(65) Prior Publication Data
US 2004/0190054 A1    Sep. 30, 2004

(30) Foreign Application Priority Data
Mar. 25, 2003    (JP)    ............... 2003-083439

(51) Int. Cl.
*H04N 1/40*    (2006.01)
(52) U.S. Cl. ..................... 358/1.15; 358/530
(58) Field of Classification Search ................ 358/1.9, 358/2.1, 1.15–1.18, 406, 504, 527, 530, 538
See application file for complete search history.

(56) References Cited

U.S. PATENT DOCUMENTS

| 5,559,708 | A | * | 9/1996 | Turnbull et al. | ............. | 700/97 |
|---|---|---|---|---|---|---|
| 5,634,090 | A |  | 5/1997 | Narukawa et al. |  |  |
| 6,130,685 | A | * | 10/2000 | Matsubara et al. | ........... | 347/41 |
| 2002/0047848 | A1 | * | 4/2002 | Odagiri et al. | .............. | 345/581 |
| 2002/0146167 | A1 | * | 10/2002 | Imamura et al. | ............ | 382/164 |

FOREIGN PATENT DOCUMENTS

JP    9-11554 A    1/1997

\* cited by examiner

*Primary Examiner*—Thomas D Lee
*Assistant Examiner*—Stephen Brinich
(74) *Attorney, Agent, or Firm*—Canon USA Inc I.P. Div

(57) ABSTRACT

Image data for a page having an amount of data exceeding the capacity of a printer memory is suitably output. A comparison is made among areas of buffer management blocks (TIME) in four data queues in which cyan, magenta, yellow, and black image data commands are stored. Then, the image data command having the earliest time is selected and is transferred to a printer. As a result, the image data is transferred in the order in which it is to be output in the printer.

4 Claims, 8 Drawing Sheets

FIG. 3

| | |
|---|---|
| PAGE START COMMAND | ~301 |
| IMAGE DATA COMMAND (BAND 1 CYAN) | ~302 |
| IMAGE DATA COMMAND (BAND 1 MAGENTA) | ~303 |
| IMAGE DATA COMMAND (BAND 1 YELLOW) | ~304 |
| IMAGE DATA COMMAND (BAND 1 BLACK) | ~305 |
| ⋮ | ⋮ |
| IMAGE DATA COMMAND (BAND 16 CYAN) | ~362 |
| IMAGE DATA COMMAND (BAND 16 MAGENTA) | ~363 |
| IMAGE DATA COMMAND (BAND 16 YELLOW) | ~364 |
| IMAGE DATA COMMAND (BAND 16 BLACK) | ~365 |
| PAGE END COMMAND | ~366 |

IMAGE TRANSFER APPARATUS

BACKGROUND OF THE INVENTION

1. Field of the Invention

The present invention relates to image transfer apparatuses, and more particularly, to an image transfer apparatus suitable for transferring image data to a printer, such as a color printer having a plurality of drums.

2. Description of the Related Art

In a typical page printer such as a laser beam printer, a printing operation begins after print data for one page is stored in memory.

However, if the entirety of print commands for one page cannot be stored in the memory due to insufficient capacity, the printing operation cannot be started.

In order to solve this problem, Japanese Patent Laid-Open No. 9-11554 ("HOST BASED PRINTER" in U.S. Pat. No. 5,634,090) discloses a method for starting a printing operation when memory becomes full before the printing operation, and then transferring the remaining portion of an image while the printing operation is being performed.

For faster printing, the so-called four-drum color printers are coming into widespread use, wherein a dedicated drum is provided for each of the colors, i.e., cyan, magenta, yellow, and black, to simultaneously print the four colors.

FIG. 8 illustrates the output timing of image data of the individual colors in a four-drum color printer. Since there is a certain distance between photosensitive drums, a plurality of colors cannot be simultaneously printed, and, as shown in FIG. 8, there is a certain regular difference of the output timing of the image data of the individual colors, i.e., cyan, magenta, yellow, and black.

In a page printer, a printing operation cannot be stopped once the output of image data is started. Accordingly, if a certain portion of the image data is not received by the time it is output, the image data becomes discontinuous, resulting in poor image quality. One way to reduce or eliminate this problem is to transfer image data in the order in which it is to be output.

In the above-described known technique, however, the order in which image data is output is not considered. For example, the transfer order of image data in a one-drum color printer is set such that the whole image data for cyan for the first page is transferred, followed by the image data for magenta for the first page. According to this transfer order, even though the head of the image data for black is simultaneously output around the end of the image data for cyan, it is transferred long after the end of the image data for cyan has been transferred.

Image data can be transferred in the order in which an image is generated in a host computer (for example, when an image is generated by dividing one page into 16 bands, the image data is transferred in the order of the cyan image of the first band, the magenta image of the first band, the yellow image of the first band, the black image of the first band, the cyan image of the second band, and so on, and finally, the black image of the sixteenth band). In this case, even though the end of the image data for cyan is simultaneously output around the head of the image data for black, it is transferred long after the head of the image data for black.

Thus, when image data of the entirety of one page cannot be stored in a printer, it cannot be suitably output from the printer.

SUMMARY OF THE INVENTION

An advantage of the present invention is that it can suitably output image data for one page having an amount of data exceeding the capacity of a printer memory.

The present invention provides an image transfer apparatus, which serves as a host computer, for simultaneously transferring image data for a plurality of color planes of an identical color page to a printer. The printer simultaneously forms an image having the plurality of color planes. The image transfer apparatus includes an order estimating unit and an image data transfer unit. The order estimating estimates the order in which image data blocks for the plurality of color planes of the identical color page are to be output in the printer. The image data transfer unit is for transferring the image data blocks in the order estimated by the order estimating means.

With this configuration, image data can be transferred in the order in which it is to be output. Accordingly, image data for a page having an amount of data exceeding the capacity of a printer memory can be suitably output. Thus, even if the entirety of image data for one page cannot be stored in the printer memory, it can be suitably output from the printer.

Other features and advantages of the present invention will be apparent from the following description taken in conjunction with the accompanying drawings, in which like reference characters designate the same or similar parts throughout the figure thereof.

BRIEF DESCRIPTION OF THE DRAWINGS

FIG. 3 illustrates examples of printer commands for one page output from a printer driver according to an embodiment of the present invention.

DETAILED DESCRIPTION OF THE INVENTION

The present invention is described below with reference to the accompanying drawings.

Figure 1:
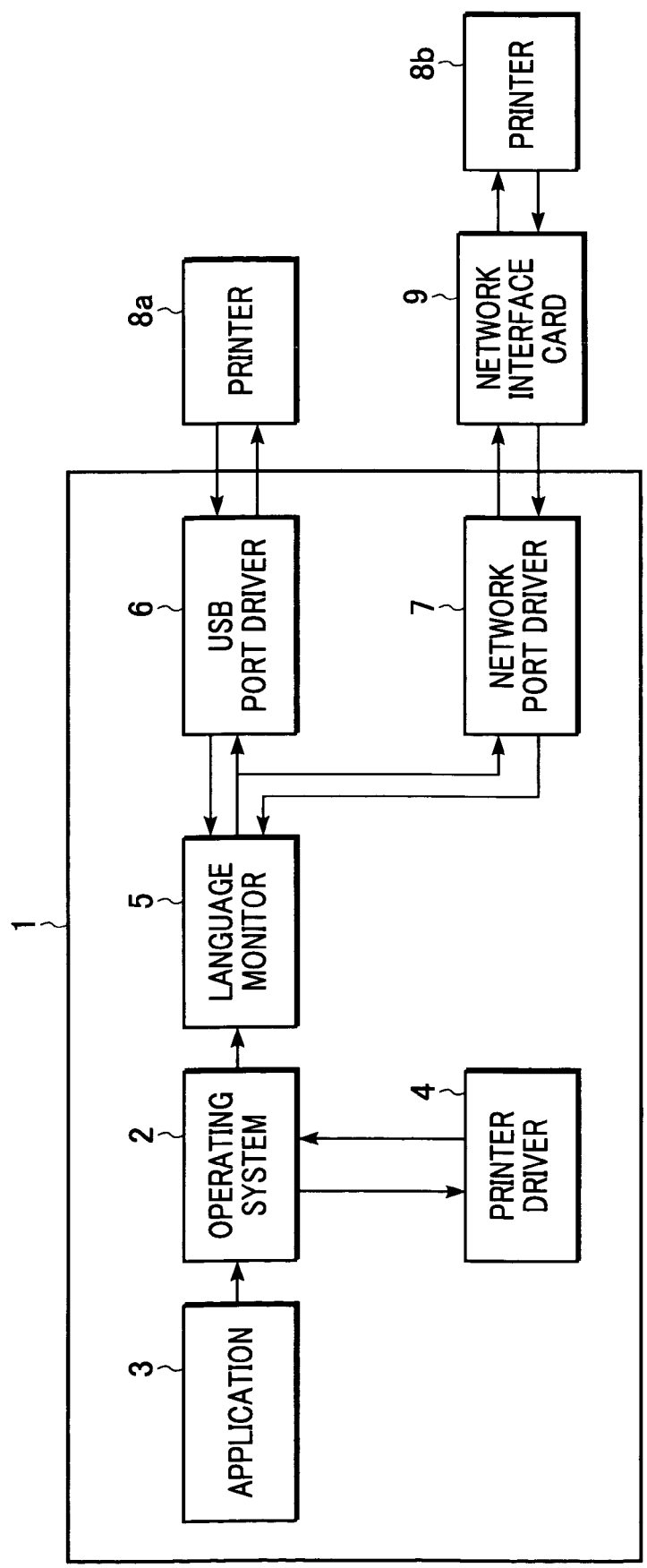
FIG. 1 is a block diagram of a print system according to an embodiment of the present invention.

FIG. 1 is a block diagram of a print system of according to an embodiment of the present invention. In FIG. 1, a host computer 1, which is disposed as an image transfer apparatus, includes hardware, such as a central processing unit (CPU), a memory, a hard disk, a flexible disk drive, a keyboard, a mouse, a monitor, a universal serial bus (USB) port, and a network interface (not shown).

An operating system 2 manages the hardware and software for the host computer 1. Examples of such software include an application 3, a printer driver 4, a language monitor 5, a USB port driver 6, and a network port driver 7.

The application 3 is an application software such as a word processor for forming and printing documents according to an instruction by an operator. The printer driver 4 receives print commands issued by the application 3 via the operating system 2 and converts them into printer commands that can be interpreted by the both the language monitor 5 and printers 8a and 8b.

The language monitor 5 receives printer commands output from the printer driver 4, and sends them to the printer 8a or 8b via the USB port driver 6 or the network port driver 7, respectively.

The USB port driver 6 sends the printer commands output from the language monitor 5 to the printer 8a via a USB port, and if the USB port driver 6 receives the status from the printer 8a, it also outputs the status to the language monitor 5.

The network port driver 7 sends the printer commands, which were output from the language monitor 5, to the printer 8b via the network interface card 9 to a network,. If the network port driver 7 receives the status from the printer 8b, it also outputs the status to the language monitor 5.

printer 8a or 8b uses printer commands received from the USB port driver 6 or the network port driver 7 for printing. Since the configurations of the printers 8a and 8b are similar, they are hereinafter referred to as the "printer 8".

The network interface card 9 sends printer commands received from the network port driver 7 through a dedicated high-speed interface to printer 8b. If the network interface card 9 receives the status from the printer 8b, it also outputs the status to the network port driver 7 via the network.

Figure 2:
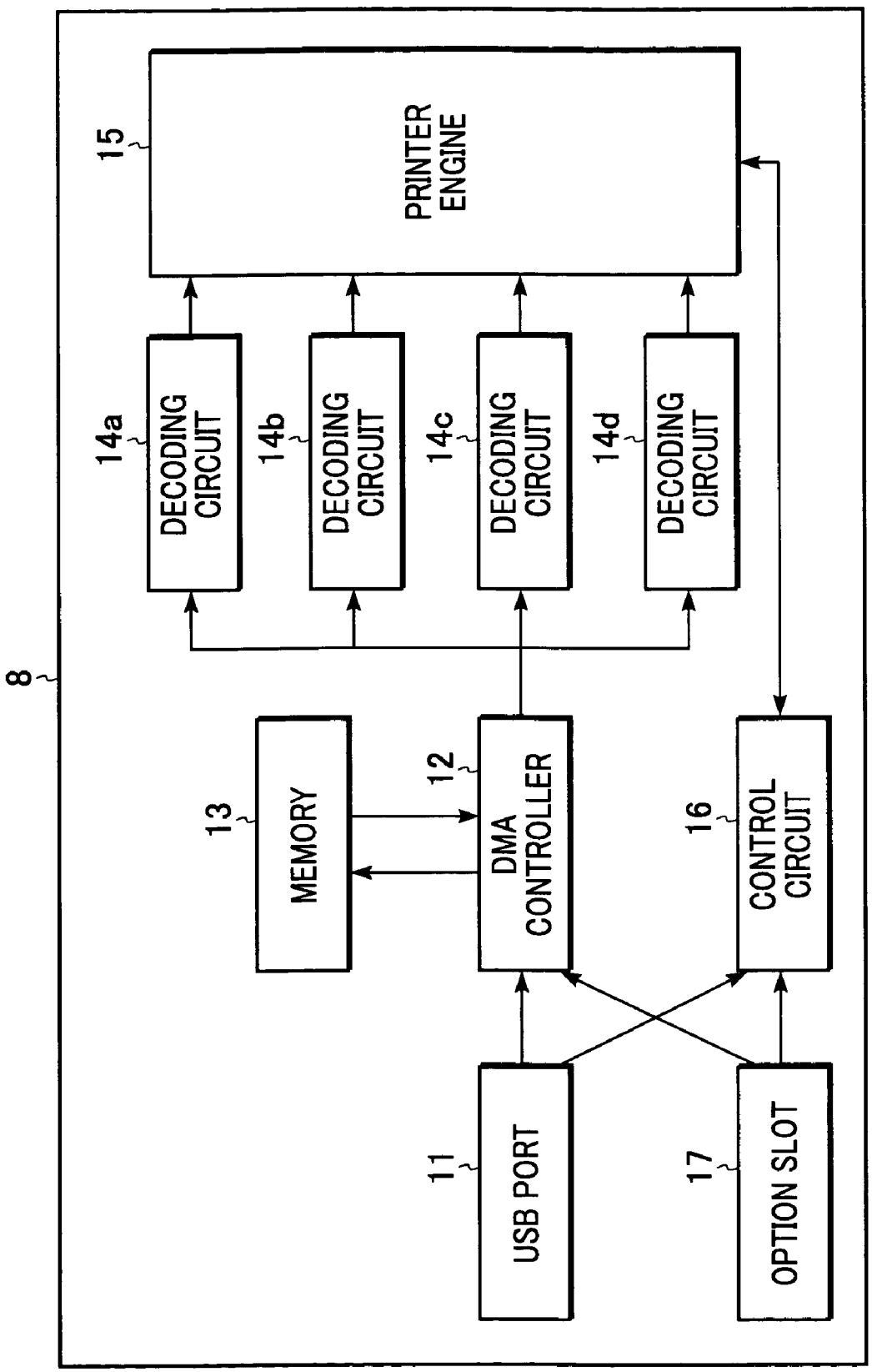
FIG. 2 is a block diagram of a printer according to an embodiment of the present invention.

FIG. 2 is a block diagram of the printer 8. In FIG. 2, a USB port 11 receives printer commands from the host computer 1. A direct memory access (DMA) controller 12 stores image data received from the USB port 11 or the network interface card 9 in a memory 13, and also outputs image data read from the memory 13 to a decoding circuit 14 (decoding circuits 14a through 14d).

The memory 13 stores or outputs image data under the control of the DMA controller 12. This memory 13 is logically divided into four channels, each being operated as a first-in first-out (FIFO) memory.

The decoding circuits 14a through 14d decode image data stored in the memory 13, and output decoded image data to a printer engine 15. The four decoding circuits 14a through 14d have the same configuration. In this embodiment, the four decoding circuits 14a through 14d having the same configuration are formed so that image data of the individual channels can be simultaneously decrypted. The four decoding circuits 14a through 14d are simply referred to as the "decoding circuit 14" when necessary.

The printer engine 15 is, for example, a laser beam printer engine that uses control circuit 16 and the image data output from the decoding circuit 14 to perform printing.

In this embodiment, the printer engine 15 is provided with four drums so that image data of the individual channels can be simultaneously printed for the four colors, i.e., cyan, magenta, yellow, and black. That is, a plurality of color planes can be simultaneously formed.

The control circuit 16 is formed of, for example, a one-chip CPU, that controls the USB port 11, the DMA controller 12, the memory 13, the decoding circuit 14, the printer engine 15, and the network interface card 9.

An option slot 17 is used for coupling the network interface card 9 to the printer 8. The network interface card 9 receives printer commands from the host computer 1. The network interface card 9 includes hardware, for example, a CPU, a random access memory (RAM), a read only memory (ROM), a network interface, and a printer interface (not shown), and receives printer commands from the host computer 1.

The printing operation in the print system of this embodiment is as follows. Based on an operator input, application 3 generates print data as a rendering function. Then, when the operator provides an instruction to print the print data, print commands are delivered from the application 3 to the printer driver 4 via the operating system 2.

The printer driver 4 converts the print data into image data and compresses it based on the print commands issued by the application 3. The compressed image data is then output together with a page start command 301, which specifies the sheet size, the length and the number of lines of bitmap data, and a page end command 366 indicating the end of the page.

The printer commands are then delivered to the language monitor 5 via the operating system 2. The language monitor 5 then transfers the received printer commands to the printer 8. After printer commands for one page are sent, the language monitor 5 sends a print start command to the printer 8 to instruct it to start printing.

The communication channel from the language monitor 5 to the printer 8 logically consists of one command channel and four data channels. The status, which is a response to a status get command, indicates whether data can be transferred in each channel.

As stated above, image data for the individual color planes (cyan, magenta, yellow, and black) received via the corresponding data channels are output to the printer engine 15 while being superimposed on each other. Accordingly, the language monitor 5 predicts the output timing of the image data of the image data block commands to the printer engine 15, and then sends the image data to the printer engine in the order in which the image data is to be output.

The image data transferred to the printer 8 as described above is stored in the memory 13. When the printer 8 receives a print start command, it instructs the printer engine 15 to start printing.

The printer engine 15 feeds a sheet from a cassette, and when the sheet reaches a predetermined position, the printer engine 15 starts outputting the image data in the order of cyan, magenta, yellow, and black.

The image data to be output to the printer engine 15 is read from the memory 13 and is decrypted by the decoding circuit 14.

FIG. 3 illustrates examples of printer commands for one page output from the printer driver 4. Each command contains a command code for identifying the type of command, information indicating the size of the command, and other items of information, which vary among the commands.

Each page starts with the page start command 301, which contains information required for printing. Examples of such information are the sheet size, the sheet-feeding cassette, the number of lines in one page, and the number of bytes of one line.

After the page start command 301, a series of image data commands 302 through 365 follow. The printer driver 4 divides one page into a plurality of (for example, 16) bands, and generates image data for each band.

Accordingly, the image data commands are output, as shown in FIG. 3, in the order of band 1 cyan 302, band 1 magenta 303, band 1 yellow 304, band 1 black 305, band 2 cyan, and so on, and finally, band 16 black 365.

The image data commands 302 through 365 each contain plane information indicating the type of color, i.e., cyan, magenta, yellow, or black, and the number of lines contained in this command, and the compressed image data. The page end command 366 is disposed at the end of each page.

Figure 4:
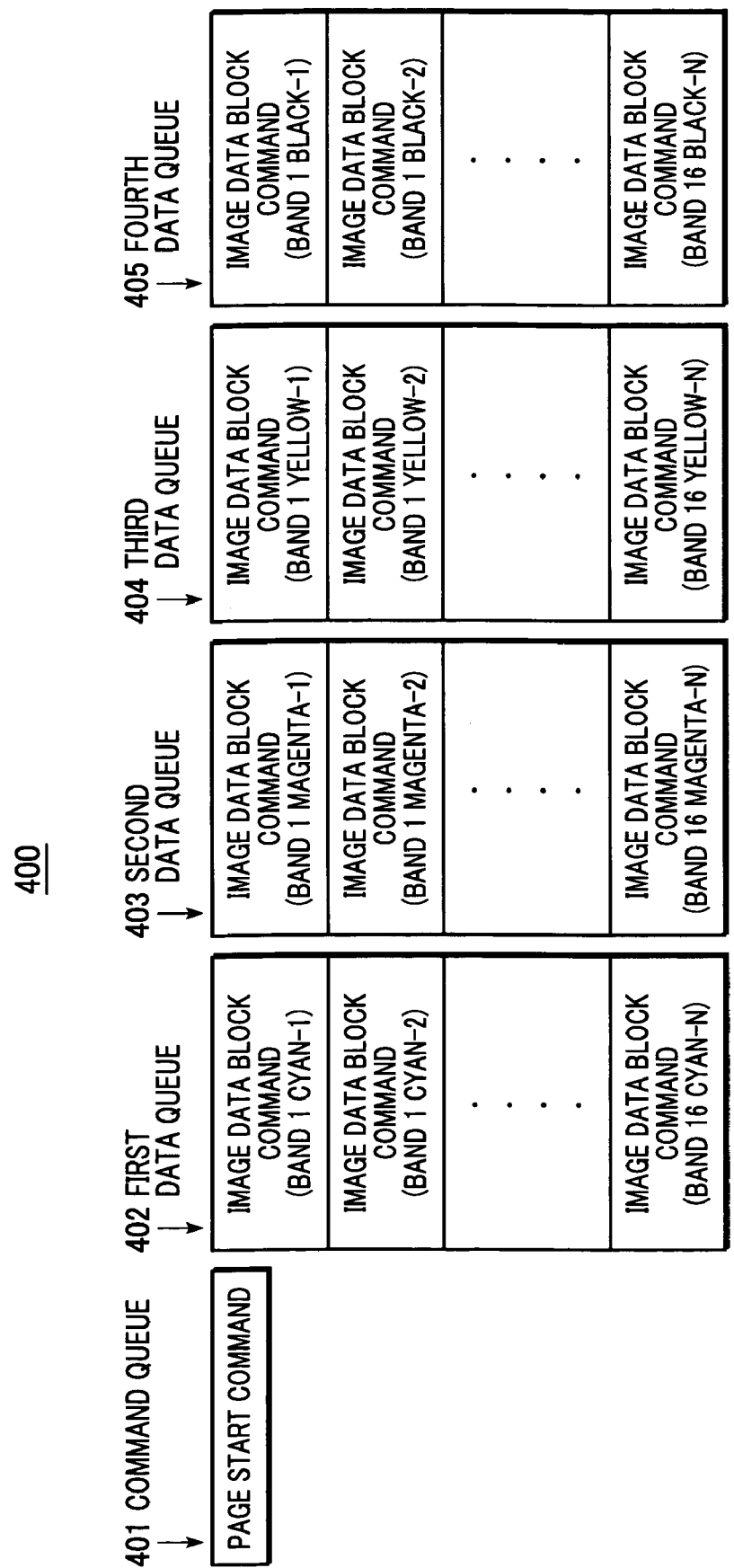
FIG. 4 illustrates examples of printer commands for one page output from a language monitor according to an embodiment of the present invention.

FIG. 4 illustrates an example of printer commands 400 for one page output from the language monitor 5. Each printer command contains a command code for identifying the type of command, information indicating the size of the command, and other items of information, which vary among the commands.

The communication channel from the language monitor 5 to the printer 8 logically consists of one command channel and four data channels. Accordingly, the printer command 400 has five queues, namely, a command queue 401, a first data queue 402, a second data queue 403, a third data queue 404, and a fourth data queue 405, for storing the transmission data.

The command queue 401 stores the page start command while the first data queue 402 stores cyan image data commands. The second data queue 403 stores magenta image data commands and, the third data queue 404 stores yellow image data commands. And, the fourth data queue 405 stores black image data commands. In this embodiment, since the page end command 366 is not sent to the printer 8, it is not stored in any command queue.

Figure 5:
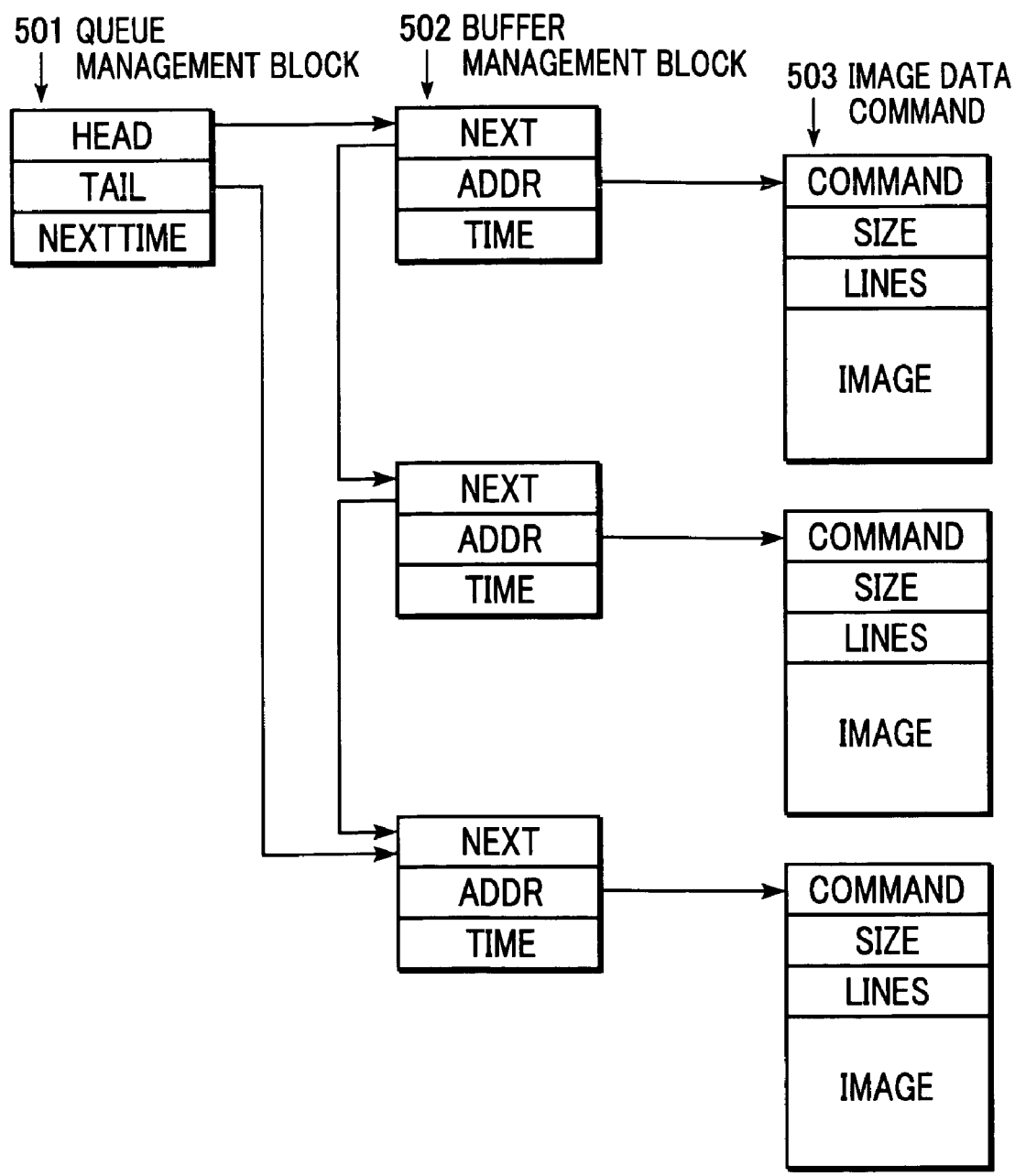
FIG. 5 illustrates an example of the data structure of a data queue according to an embodiment of the present invention.

FIG. 5 illustrates an example of the data structure of one data queue. In FIG. 5, a queue management block 501 is a data structure for managing the data queue, which includes three areas, i.e., HEAD, TAIL, and NEXTTIME.

The HEAD area represents the address of a buffer management block 502 located at the head of the queue. The TAIL area represents the address of a buffer management block 502 located at the end of the queue. The NEXTTIME area is a work area in which the output timing of each image data command 503 to be output to the printer engine 15 is calculated.

The buffer management block 502 is a data structure for managing the corresponding image data command 503. This block includes three areas, namely, NEXT, ADDER, and TIME areas. The NEXT area designates the address of the subsequent buffer management block 502. The ADDER area designates the address of the image data command 503 managed by the buffer management block 502. The TIME area indicates the output timing of the image data command 503 managed by the buffer management block 502 to the printer engine 15.

The image data command 503 has four areas, i.e., COMMAND, SIZE, LINES, and IMAGE areas. The COMMAND area indicates that this command is an image data command and the type of color. The SIZE area represents the size of the image data command. The LINES area designates the number of lines of the image data. The IMAGE area indicates that this image is compressed image data.

Figure 6:
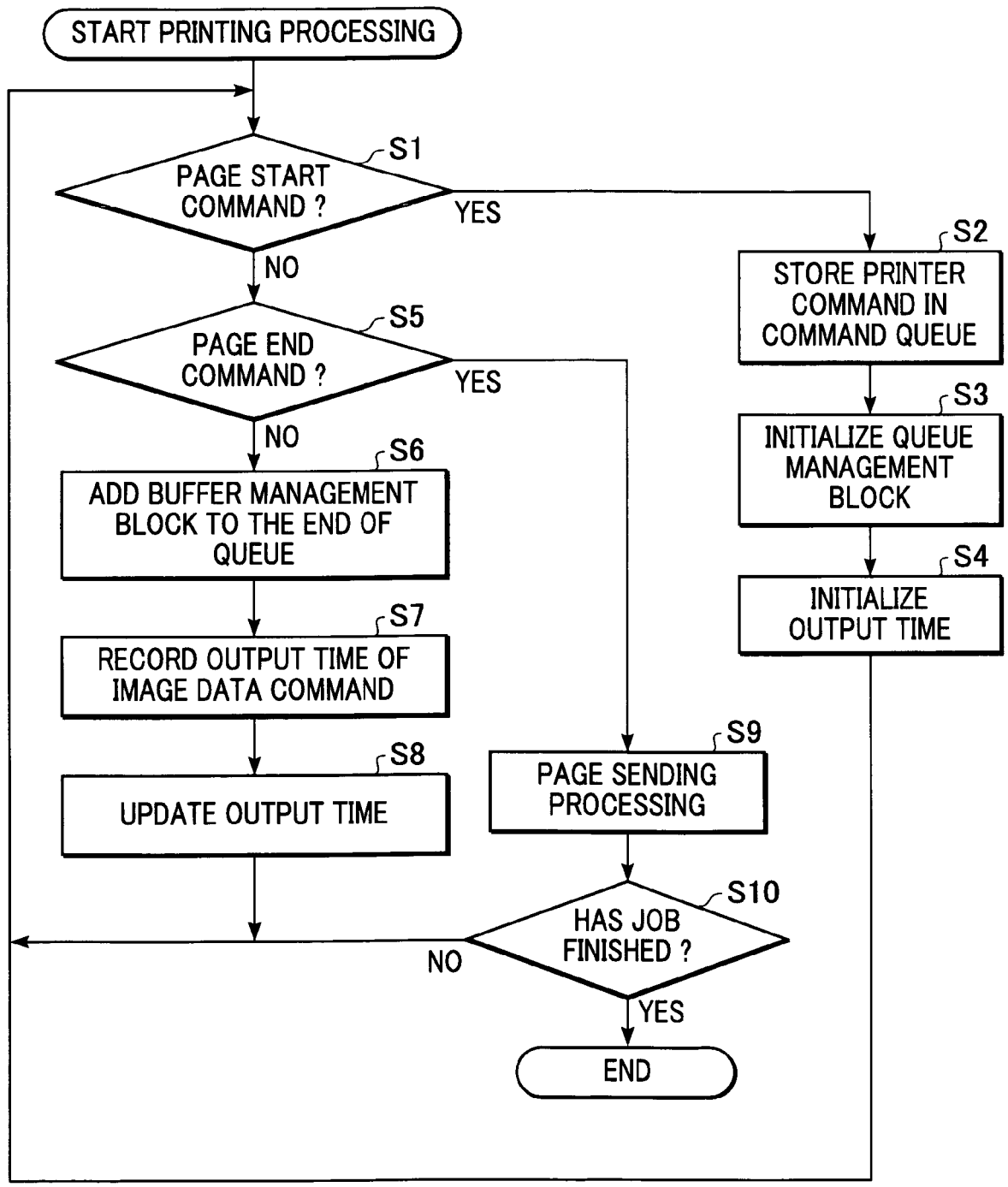
FIG. 6 illustrates the processing performed by the language monitor according to an embodiment of the present invention.

FIG. 6 is a flowchart illustrating an example of the processing performed by the language monitor 5. When the language monitor 5 is called by the operating system 2, a determination is made in step S1 as to whether the command is the page start command 301.

If the printer command is the page start command 301, it is stored in the command queue 401 in step S2. Then, in step S3, the queue management block 501 is initialized.

Subsequently, in step S4, the NEXTTIME area is initialized. More specifically, the time period from the output start time of the first cyan image data to the output start time of each of the other image data is calculated in terms of the number of lines, and is then stored in the NEXTTIME area.

In a page printer, the individual lines of image data are output at regular intervals (for example, in units of 500 microseconds), and thus, the above-described time period can be calculated in terms of the number of lines by dividing the time period by the line interval. The process then returns to step S1, and the command processing is continued.

If it is determined in step S1 that the printer command is not the page start command 301, the process proceeds to step S5 to determine whether the printer command is the page end command 366.

In step S5, if the printer command is not the page end command 366, then that printer command is an image data command. Then, in step S6, the buffer management block 502 is added to the end of the data queue for managing the color of the image data command, and the image data command 503 is stored in the ADDER of the buffer management block 502.

Then, in step S7, the value stored in the NEXTTIME area of the queue management block 501 is stored in the TIME of the buffer management block 502 added in step S6.

Subsequently, in step S8, the value stored in the LINES of the image data command 503 is added to the NEXTTIME area of the queue management block 501. Then, the number of lines equivalent to the output time of the subsequent image data of the same color is stored in the NEXTTIME area of the queue management block 501. The process then returns to step S, and the command processing continues.

If it is found in step S5 that the printer command is the page end command 366, page sending processing is performed in step S9. It is then determined in step S10 whether all the commands have been processed. If the outcome of step S10 is no, the process returns to step S1, and the command processing continues. If all the commands have been processed, the process is completed.

Figure 7:
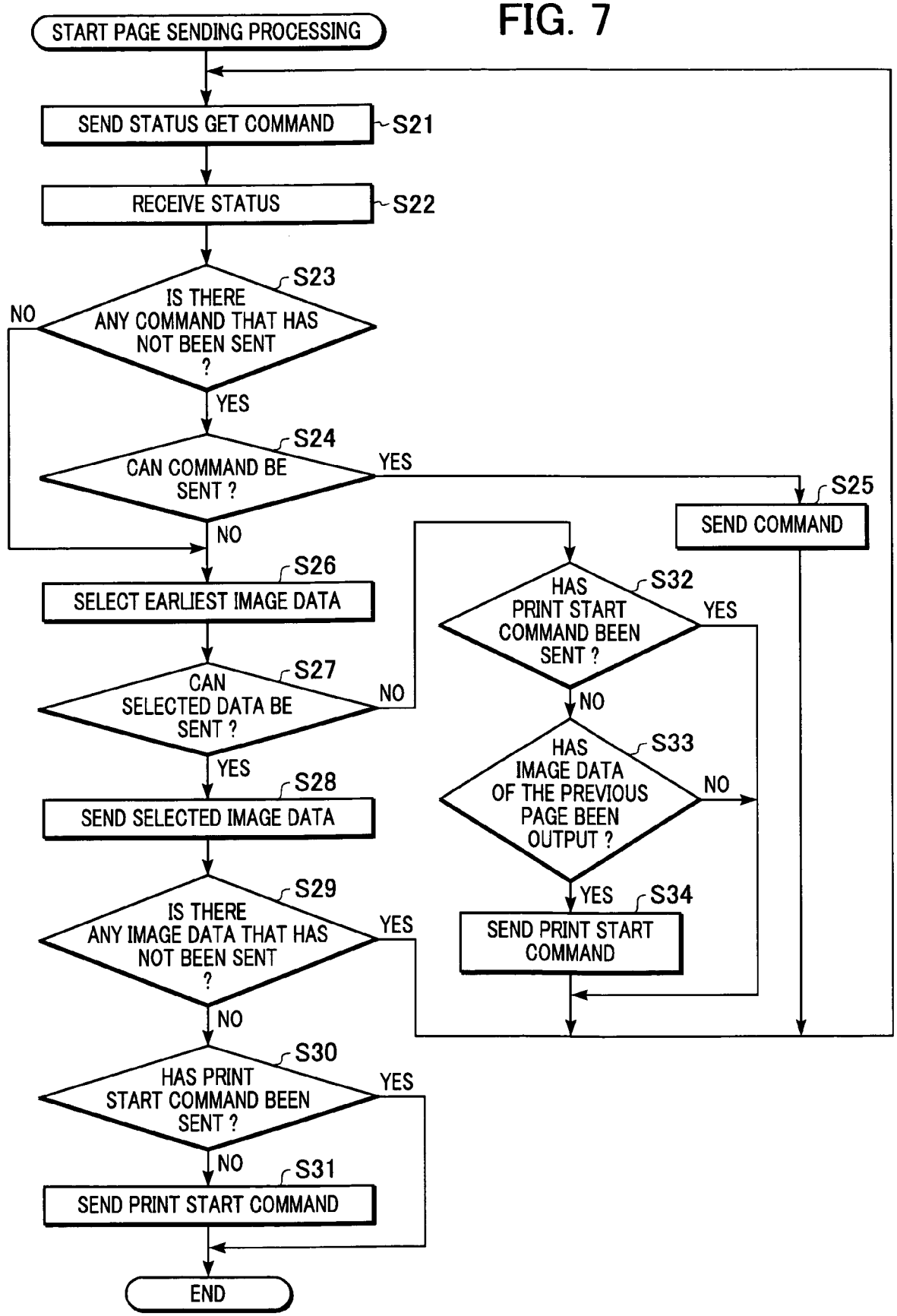
FIG. 7 illustrates page sending processing performed by the language monitor according to an embodiment of the present invention.
Figure 8:
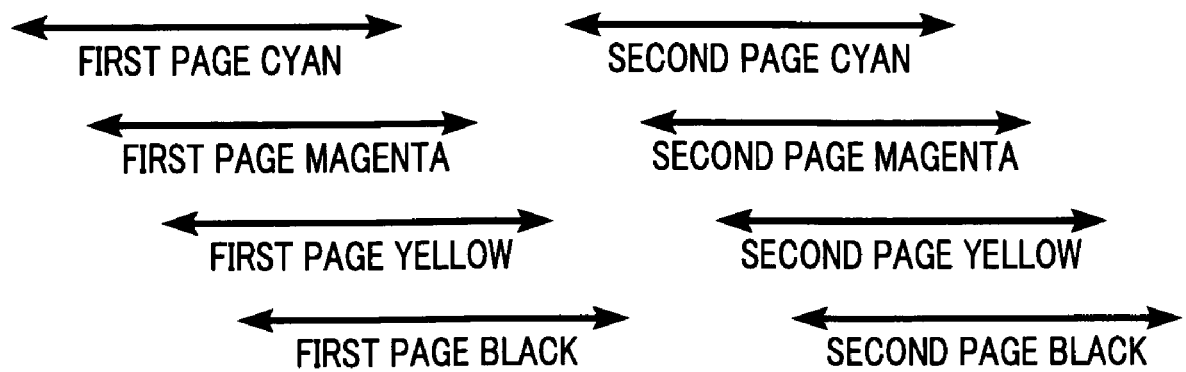
FIG. 8 illustrates the transfer timing of image data in a four-drum color printer.

Details of the page sending processing in step S9 of FIG. 6 are given below with reference to FIG. 7. In step S21, a status get command is sent.

Then, in step S22, the status is received. The received status includes information indicating whether the buffer of each channel has sufficient space for storing the predetermined maximum size of image data commands. The information also includes whether it is possible to send a command for the corresponding channel, and information indicating the page number at which the output of the image data has been finished. The status get command and the print start command can be sent regardless of the status.

Subsequently, it is determined in step S23 whether there is a command that has not been sent in the command queue 401. If the outcome of step S23 is yes, the process proceeds to step S24 in which a determination is made as to whether the received status indicates that the command in the command queue 401 can be sent.

If the result of step S24 is yes, the process proceeds to step S25 in which the first command in the command queue 401 is sent. Then, the process returns to step S21. The command sent in step S25 is removed from the command queue 401.

In step S23, if there is no command in the command queue 401, or the command cannot be sent in step S4, the process proceeds to step S26.

In step S26, a comparison is made among the areas TIME of the head buffer management blocks 502 of the four data queues 402 through 405, and the image data command 503 having the earliest time (that is, having the smallest value stored in the TIME) is selected.

In step S27, it is determined whether the received status permits the image data to be transferred in the channel corresponding to the image data command 503 selected in step S26.

If the result of step S27 is yes, the process proceeds to step S28 in which the selected image data command 503 is sent.

The image data command 503 sent in step S28 and the buffer management block 502 managing the image data command 503 are removed from the queue. Then, in step S29 it is determined whether there is any image data that has not been sent in any of the four data queues 402 through 405. If any image data has not been sent, the process returns to step S21.

When all the image data have been sent, the process proceeds to step S30 to determine whether a print start command has been sent. If the print start command has been sent, the page sending processing is completed. If the print start command has not been sent, the print start command is sent in step s31 to complete the page sending process.

If it is found in step S27 that the received status does not permit the image data to be transferred in the channel corresponding to the image data command 503 selected in step S26, the process proceeds to step S32. In step S32, a determination is made as to whether the print start command has been sent. If the outcome of step S32 is yes, the process returns to step S21.

In step s33, if the print start command has not been sent, it is determined whether the output of the image data of the previous page of the currently sending page is finished.

If the result of step S33 is no, then the image data of the previous page is stored in the memory 13 and it will eventually be output to the printer engine 15 to release the space of the memory 13. Accordingly, the process returns to step S21 and waits until then.

If it is found in step S33 that the output of the image data of the previous page is finished, it means that there is no possibility of releasing the space in the memory 13. Thus, the process proceeds to step S34 in which the print start command is sent, and the process then returns to step S21.

As described above, the image data commands 503 are transferred to the printer engine 15 in the output order, and the print start command is sent when the output of one page is finished or when the memory 13 becomes full.

The specific printing operation is with reference to FIGS. 1 and 2. As shown, the host computer 1 sends a page start command. The printer 8 receives the page start command, and stores it in the memory within the control circuit 16.

The host computer 1 then sends image data in the order in which it should be output to the printer 8 so long as it is allowed to be transferred by the printer 8. The printer 8 then receives the image data and stores it in the memory 13.

When the entire image data for one page is stored in the memory 13, the host computer 1 sends a print start command. The printer 8 then receives the print start command, and instructs the printer engine 15 to start printing.

The printer engine 15 feeds a sheet from a cassette, and when the sheet reaches a predetermined position corresponding to each drum, the printer engine 15 receives the image data from the corresponding decoding circuits 14 so as to form an image on the sheet.

Each decoding circuit 14 reads data from the corresponding FIFO memory formed in the memory 13, and decodes the data. Then, the space for the image data read from the memory 13 is released.

When the size of the image data for one page is large, the memory 13 becomes full before the entire image data is sent. Accordingly, the printer 8 informs the host computer 1 through the status which channel does not have a space for storing the predetermined maximum size of the image data commands 503.

In this case, the host computer 1 waits until the output of the image data of the previous page is finished. Even so, however, there is no space for storing the maximum size of the image data commands 503, the host computer 1 sends the print start command. Then, the printing operation is started, and when a certain amount of image data is output to the print engine 15, space is created in the memory 13.

The printer 8 reports to the host computer 1 through the status that a space is created in the memory 13. The host computer 1 then restarts sending the image data. In this manner, the image data can be transferred while the printing operation is being performed.

The same applies to the case in which the printing operation is performed between the printer 8 and the host computer 1 via the network interface card 9, which retains one queue. When a command is received from the host computer 1, it is added to the end of the queue. If the received command is a print start command, it is not stored in the queue, but is immediately sent to the printer 8.

Similarly, if the received command is a status get command, it is not stored in the queue, but the status obtained from the printer 8 is sent to the host computer 1. In this case, the status includes information indicating whether the command can be sent in each channel. This information is modified by reflecting the status of the network interface card 9 in the information before being sent.

More specifically, if there is sufficient space to accommodate the predetermined maximum size of the image data commands 503 in the network interface card 9, the sending of the image data in all the channels is permitted. If not, the sending of the image data in all the channels is prohibited.

The network interface card 9 also voluntarily sends a status get command to the printer 8 so as to obtain the status, and if the first command in the queue can be sent, the network interface card 9 sends the command to the printer 8.

As noted above, a comparison is made between the areas TIME of the first buffer management blocks 502 of the four data queues 402 through 405 in which the image data commands of the individual colors, i.e., cyan, magenta, yellow, and black, respectively, are stored. The image data command 503 having the earliest time (namely, having the smallest value stored in TIME) is then selected and transferred to the printer 8. Accordingly, the image data is transferred in the order in which it is to be output in the printer 8. Thus, even when the entirety of the image data for one page cannot be stored in the printer 8, the printing operation can be suitably performed.

Although in the above-described embodiment the language monitor 5 uses the four data queues 402 through 405, it may use a single data queue. In this case, image data may be added to the data queue while being sorted in the order in which the image data commands are output.

In the foregoing embodiment, if the output of the earliest image data is not permitted, the language monitor 5 prohibits the output of another image data. Alternatively, if another image data is available, the output of such data may be permitted.

Although in the above-described embodiment the network interface card 9 retains only one queue, it may retain five queues, as in the host computer 1, so that image data can be sent in the order in which they are received.

To implement the functions of the above-described embodiment, software program codes implementing these functions may be supplied to a computer within an apparatus or a system connected to various devices, and then, the devices may be operated according to the program stored in the computer (or a CPU or an MPU) within the system or the apparatus. The present invention encompasses such a modification.

In this case, since the software program codes themselves implement the functions of the above-described embodiment, the program codes, means for supplying such program codes to the computer, and recording media in which the program codes are stored form the present invention. The recording media storing the program codes therein include, for example, flexible disks, hard disks, optical discs, magneto-optical disks, CD-ROMs, magnetic tape, non-volatile memory cards, and ROMs.

The computer may execute the supplied program codes so as to implement the above-described functions. The functions may also be implemented by executing the program codes in cooperation with an operating system or another application running in the computer. The present invention also encompasses such modifications.

The program codes supplied to the computer may be stored in a feature expansion board memory of the computer or a feature expansion unit memory connected to the computer, and then, a CPU provided for the feature expansion board or the feature expansion unit may execute part of or the entirety of the processing based on an instruction of the program codes, thereby implementing the functions of the embodiment. The present invention also encompasses such a modification.

As many embodiments of the present invention can be made, it is to be understood that the invention is not limited to the above-described embodiments except as defined in the appended claims.

What is claimed is:

1. An image transfer apparatus for simultaneously transferring image data for a plurality of color planes of an identical color page to a printer for simultaneously forming an image having the plurality of color planes, said image transfer apparatus comprising:
    order estimating means for estimating the order in which image data blocks for the plurality of color planes of the identical color page are to be output in the printer;
    image data transfer means for transferring the image data blocks in the order estimated by said order estimating means; and
    transfer-enable-signal receiving means for receiving from the printer a signal indicating whether an image data block transferred by said image data transfer means is transferable,
    wherein, when the signal received by said transfer-enable-signal receiving means indicates that an image data block estimated by said order estimating means to be located at the head of the order is transferable, said image data transfer means transfers the image data block, and when the signal received by said transfer-enable-signal receiving means indicates that the image data block is not transferable, said image transfer means transfers another image data block which is transferable.

2. An image transfer method for use in a host computer for simultaneously transferring image data for a plurality of color planes of an identical color page to a printer for simultaneously forming an image having the plurality of color planes, said image transfer method comprising:
    an order estimating step of estimating the order in which image data blocks for the plurality of color planes of the identical color page are to be output in the printer;
    an image data transfer step of transferring the image data blocks in the order estimated by said order estimating step; and
    a transfer-enable-signal receiving step of receiving from the printer a signal indicating whether an image data block transferred by said image data transfer step is transferable,
    wherein, when the signal received by said transfer-enable-signal receiving step indicates that an image data block estimated by said order estimating step to be located at the head of the order is transferable, said image data transfer step transfers the image data block, and when the signal received by said transfer-enable-signal receiving step indicates that the image data block is not transferable, said image transfer step transfers another image data block which is transferable.

3. A computer-readable medium storing a computer program that can be executed by a host computer for simultaneously transferring image data for a plurality of color planes of an identical color page to a printer for simultaneously forming an image having the plurality of color planes, said computer program comprising:
    an order estimating step of estimating the order in which image data blocks for the plurality of color planes of the identical color page are to be output in the printer;
    an image data transfer step of transferring the image data blocks in the order estimated by said order estimating step; and
    a transfer-enable-signal receiving step of receiving from the printer a signal indicating whether an image data block transferred by said image data transfer step is transferable,
    wherein, when the signal received by said transfer-enable-signal receiving step indicates that an image data block estimated by said order estimating step to be located at the head of the order is transferable, said image data transfer step transfers the image data block, and when the signal received by said transfer-enable-signal receiving step indicates that the image data block is not transferable, said image transfer step transfers another image data block which is transferable.

4. An image transfer method for transferring image data for a plurality of color planes of a color page to a printer for forming an image having the plurality of color planes, said image transfer method comprising:
    estimating the order for outputting the image data blocks of the plurality of color planes of the color page to the printer;
    transferring the image data blocks to the printer in the estimated order; and
    receiving from the printer a signal to indicate whether an image data block is transferable,
    wherein, when the signal indicates that the image data block estimated to be located at the head of the order is transferable, the image data block is transferred, and when the signal indicates that the image data block is not transferable, another image data block, which is transferable is transferred.

* * * * *